3,091,523
PROCESS OF PRODUCING HIGH-NITROGEN, LOW-CHLORIDE NITRAPHOSPHATE COMPLETE FERTILIZERS
Joseph A. Smith, Richmond, and Stanford R. Young, Hopewell, Va., assignors to Allied Chemical Corporation, New York, N.Y., a corporation of New York
No Drawing. Filed Aug. 22, 1960, Ser. No. 50,883
5 Claims. (Cl. 71—37)

This invention relates to the production of high-nitrogen, low-chloride nitraphosphate complete fertilizers, and more particularly to the production of such fertilizers containing at least about 35% plant food.

The production of complete fertilizers by acidulating phosphate rock followed by ammoniation of the acidulated material and the incorporation of potassium as potassium chloride or potassium sulfate in the ammoniated material has been suggested (see, for example, 2,680,680 of June 8, 1954). Such procedures have the advantage that the raw material costs for the high-nitrogen complete fertilizers are relatively low. However, the preparation of such fertilizers, in which the amount by weight of nitrogen is 1.5 or more times the weight of the available $P_2O_5$ content, invariably results in highly viscous slurries, difficult to handle unless the water content of the slurry is high, 40% or more. Such high water content slurries are, of course, objectionable from the standpoint of the expense entailed in effecting the drying. The drying expense may be so large as to nullify the savings effected by the use of comparatively inexpensive raw materials.

Viscous slurry difficulties are particularly serious when potassium sulfate is employed as the salt to supply the $K_2O$ content of the fertilizer. While the incorporation of potassium chloride in slurries containing from 20% to 30% water results in slurries which are not unduly viscous, the incorporation of potassium sulfate markedly increases the viscosity of the slurry and, unless enough water is added, results in a viscous mass difficult, if not impossible to ammoniate and further process.

The inclusion of sulfate ion in the acidulated phosphate rock mixture to prevent reversion of the $P_2O_5$ content of the fertilizer to citrate-insoluble forms during ammoniation is known. It is desirable to use potassium sulfate for this purpose because the salt supplies both the $SO_4$ and $K_2O$ values without addition of other anions. The elimination of excess non-fertilizer ions is of special importance in the formulation of high analysis fertilizers, i.e., those containing about 35% or more total plant food. Inclusion of such non-fertilizer ions in the fertilizer makes it necessary, in order to obtain the desired high content of $P_2O_5$, to utilize sources of $P_2O_5$ more concentrated than phosphate rock such as phosphoric acid or concentrated superphosphate to supply the $P_2O_5$ requireemnts with consequent added cost in producing the fertilizer. Also, for certain crops, such, for example, as tobacco, nitraphosphate fertilizers containing potassium sulfate rather than potassium chloride are of special utility. The incorporation of potassium sulfate, however, as noted above, entails the problem of forming and handling excessively viscous slurries.

In heretofore known procedures involving the production of nitraphosphate fertilizers containing potassium sulfate, in order to avoid the production of slurries during ammoniation of the acidulated phosphate rock, which slurries are too viscous to permit efficient handling, the slurries are maintained fluid by adding enough water during ammoniation to increase the water content so as much as 40% to 60% by weight. The additional water thus required must be removed during subsequent drying and, as noted above, is objectionable because of the high operating costs entailed in effecting the drying.

It is among the objects of the present invention to provide a process for producing high-nitrogen, low-chloride nitraphosphate complete fertilizers containing potassium sulfate, which process does not involve the difficulties heretofore encountered with highly viscous slurries resulting from the addition of the potassium sulfate to the acidulated phosphate rock subjected to ammoniation, and this without utilizing a relatively high water content of the slurry subjected to ammoniation.

Other objects and advantages of the present invention will be apparent from the following detailed description thereof.

In accordance with this invention, phosphate rock is acidulated with nitric acid or a mixed acid consisting of nitric and phosphoric acids containing at least 50% nitric acid, employing from about 8 to about 20, preferably from about 11 to about 16, equivalents of acid (or mixed acid, if a mixed acid is used) per mol of $P_2O_5$ in the phosphate rock. By an equivalent of acid is meant the quantity of acid which contains 1 formula weight of hydrogen ion, i.e., 1 mol of nitric acid and ½ mol of phosphoric acid. Phosphoric acid is considered a dibasic acid because during the ammoniation of the acidulated rock dicalcium phosphate is formed, i.e., 1 hydrogen ion remains with the phosphoric acid. The acidulation is carried out in the presence of from about 25% to 40% water, the amount of water usually present in commercial grades of acid.

Potassium sulfate in amount to produce a final product containing from about 8% to about 14% $K_2O$ is added to the acidulated mixture either before the ammoniation is commenced or during the early stages of the ammoniation when the pH of the mixture is below 1.

The acidulated mixture is agitated and ammoniated employing from about 0.6 to about 0.8 mol of ammonia per equivalent of acid used in the acidulation and enough water to provide a slurry containing from 20% to 30% water at the completion of the ammoniation. The agitation is sufficiently vigorous that the reaction mixture is in turbulent movement. Employing an acidulated reaction mixture containing from 25% to 40% water, addition of from 0% to 15% water based on the solids content of the slurry subjected to ammoniation will suffice to produce a slurry containing at the end of the ammoniation from 20% to 30% water.

The initial 50% to 60%, preferably 50% to 55%, of the total ammonia introduced during the ammoniation is added at a rate not exceeding 3% of the total ammonia per minute, preferably at a rate of from 1.5% to 3% per minute of the total ammonia. By so doing, excessive foaming is avoided. Thereafter the rate of addition of ammonia is reduced to below 0.8% of the total ammonia per minute, preferably below 0.7% of the total ammonia per minute, until 70% to 80%, preferably about 75%, of the total ammonia has been added. Addition of the ammonia during this critical portion of the ammoniation desirably is effected at a rate of about 0.6% to 0.7% of the total ammonia per minute, although even slower rates may be used. The critical factor is that the rate of addition during this portion of the ammoniation be below 0.8%, preferably below 0.7% of the total ammonia per minute.

When 70% to 80%, preferably 75%, of the total ammonia has been added, the ammoniation rate can be increased to about 3% of the total ammonia per minute for the remainder of the ammoniation. Preferably the addition of the ammonia during the final stage of the ammoniation is at a rate of about 1% to 2% per minute of the total ammonia.

Surprisingly, we have found that by ammoniating the acidulated mixture containing from 20% to 30% water in this manner, a fluid slurry having a viscosity under 1,000 cps. is maintained throughout the ammoniation. These viscosities are measured under conditions of agitation and temperature existing during the ammoniation, using a Brookfield Synchro-lectric Viscometer. Addition of the ammonia at a uniform rate to the acidulated mixture containing potassium sulfate results in rapid increase of the viscosity of the slurry unless a water content is maintained such as to produce a slurry having from 40% to 60% or more water at the completion of the ammoniation. Ammoniating such slurries containing potassium sulfate by starting the ammoniation at a high rate of ammonia addition and gradually decreasing the addition rate with time until the ammoniation is completed gives substantially the same objectionable high viscosities unless the water content of the slurry is increased to a level that it contains from 40% to 60% or more upon completion of the ammoniation. It is not unusual when ammoniating such slurries containing about 20% to 30% water, upon completion of the ammoniation by either the procedure of uniform addition of the ammonia or addition in gradually decreasing amounts, to produce slurries having viscosities exceeding 10,000 cps.

The ammoniation may be carried out in single or multiple stages. Thus the ammonia may be added as described above to the acidulated mixture while the latter is in one and the same vessel until the ammoniation has been completed. Alternatively the acidulated material may flow in series through a plurality of vessels and the ammonia added thereto during such flow at the rates above given.

The acidulated slurry subjected to ammoniation has a temperature of from 40° to 80° C. During the ammoniation the heat liberated by reaction of the ammonia and the acid results in a temperature rise. During addition of the first 50% to 60% of the ammonia, the temperature is controlled to maintain it below 100° C. to minimize foaming. Cooling of the slurry during this stage of the ammoniation is employed in those cases where the temperature during the addition of the first 50% to 60% of the ammonia tends to rise above 100° C. During the rest of the ammoniation, the temperature is maintained within the range of 100° C. to the boiling point of the mixture, preferably within the range of from 105° to 115° C.

Other salt enriching constituents which may be absent from certain soils such, for example, as the salts of copper, zinc, iron, manganese, molybdenum, cobalt, magnesium, boron, may also be incorporated during the latter stages of the ammoniation or after the ammoniation has been completed. Such salts are added in minor amounts, desirably in the form of the sulfate, chloride or carbonate. Also other fertilizer salts may be added to the slurry during or after ammoniation such as urea, ammonium nitrate or a small amount of potassium chloride.

The ammoniated mixture containing from 20% to 30% water is dried in any suitable manner, for example, by blending with recycled dried material to produce a mixture containing from 2% to 5% water, which mixture is dried, for example, in a conventional rotary drier to reduce the water content to about 2% or less, preferably about 1%. The dried material is screened and a portion of the screened product having the desired mesh size withdrawn as product and the remainder crushed and recycled for admixture with the ammoniated slurry as hereinabove described. Alternatively the ammoniated slurry may be further concentrated, for example, by evaporation before combining with recycled dried material, thus reducing the quantity of recycled dried material mixed with the ammoniated material.

The phosphate rock employed in this process may be any form of phosphate rock commercially available and may be used as mined, e.g., having a particle size such that it passes through a 30 to 40-mesh screen. Preferably, however, the rock is crushed to a size to pass through a 100-mesh screen or finer. The rock subjected to acidulation may be mixed with a small amount of triple superphosphate ($CaH_2PO_4)_2$ substantially free of calcium sulfate) if it is desired to produce a fertilizer having a higher $P_2O_5$ content than that obtained utilizing only the phosphate present in the rock.

The fertilizer product produced as hereinabove described contains from 15% to 21% nitrogen, from about 8% to 14% of available $P_2O_5$ and from about 8% to 14% $K_2O$. Preferred products are the 20-10-10, 15-10-10, and 18-9-9 products which, because of their high food value, are useful in fertilizing crops with fewer fertilizer applications and thus save labor. These values refer respectively to the percentage content of nitrogen, available $P_2O_5$ and $K_2O$.

The following example is illustrative of the practice of this invention to produce high-nitrogen, low-chloride complete fertilizers. It will be understood the invention is not limited to the following example. In the example all parts are by weight.

*Example*

The following materials were fed to an acidulator equipped with an agitator:

| | Parts |
|---|---|
| Phosphate rock (33.6% $P_2O_5$, 49.0% CaO) | 17.65 |
| Phosphoric acid (45.6% $P_2O_5$) | 2.74 |
| Nitric acid (58% $HNO_3$) | 60.40 |

The mixture contained 33% water derived from the acids. The rock was digested with the acids for 10 minutes at 47°–62° C. Seven such batches were produced.

The seven batches were introduced into an ammoniator equipped with an agitator and a jacket for cooling. 100 parts of $K_2SO_4$ (48.9% $K_2O$, 49.5% $SO_4$) were added to the ammoniator and the resulting slurry ammoniated with 53 parts of ammonia to a pH of 3.9. During the ammoniation, the agitation was vigorous so that the reaction mixture was in turbulent movement. The first 51% of the total ammonia was added at a rate of 2.04% of the total ammonia per minute, the next 20% at a rate of 0.64% of the total ammonia per minute, and the remainder at a rate of 1.27% of the total ammonia per minute. The total time for the ammoniation was 79 minutes. The batch was cooled intermittently during addition of the first 51% of the total ammonia to maintain temperature below 100° C. A maximum temperature of 115° C. was reached near the end of ammoniation. The slurry remained fluid throughout acidulation and ammoniation and could be agitated and pumped readily. The ammoniated slurry contained 25% water. At no time during the ammoniation did the viscosity exceed 1,000 c.p.s.

The ammoniated slurry containing 25% water was concentrated to 10% water using a Turba-Film evaporator operated at 150 p.s.i.g. steam pressure. The slurry entered the evaporator at 100° C. and left at 121° C. Slurry was fed to the evaporator to give a rate of 280 parts per hour of concentrated slurry exiting from the evaporator. This concentrated slurry was mixed in the blender with 980 parts per hour of dried material recycled from a later step in the process. Approximately 1,260 parts per hour of material containing 3% $H_2O$ was thus produced. This mixture was passed through a rotary hot air drier entering at about 75° C. and leaving at 98° C. It was then passed through a rotary cooler where it was cooled to about 70° C. About 1,235 parts per hour of material containing 1.0% $H_2O$ was thus produced. The dried material was passed through vibratory screens and 255 parts per hour removed as product having a mesh size between 10 and 20-mesh. The oversize material was crushed and recycled along with the remainder of the product size material and material passing a 20-mesh screen, to the blender to be mixed with fresh slurry as previously described. The final dry product passed to storage was in the form of hard, solid granules which were homogeneous, non-caking, free-flowing, and chemically stable. The 18-9-9 fertilizer thus produced was practically free of chloride.

It will be noted this invention provides a process for producing high-nitrogen, low-chloride nitraphosphate complete fertilizers involving the addition of potassium sulfate to the acidulated mixture to supply $SO_4$ ion during the ammoniation, thus preventing reversion of citrate-soluble $P_2O_5$ to the citrate-insoluble form and also supplying the desired potassium content of the fertilizer, in which process the ammoniation of the slurry is carried out without producing a highly viscous mass difficult to handle, and this while maintaining the water content relatively low, thus not requiring relatively costly drying.

Since different embodiments of this invention could be made without departing from its scope, it is intended that all matter contained in the above description shall be interpreted as illustrative and not in a limiting sense.

What is claimed is:

1. The process of producing high-nitrogen, low-chloride nitraphosphate complete fertilizers which comprises: step 1, treating phosphate rock with an acid from the group consisting of nitric acid and mixtures of nitric and phosphoric acid containing at least 50% nitric acid in the proportions of from about 8 to about 20 equivalents of acid per mol of $P_2O_5$ in the phosphate rock; step 2, incorporating potassium sulfate in the acidulated mixture in amount to produce a final product containing from about 8% to about 14% $K_2O$ and ammoniating the acidulated material employing from about 0.6 to about 0.8 mol of ammonia per equivalent of acid and enough water so that the ammoniated material leaving the ammoniation treatment contains about 20% to about 30% by weight of water, the ammoniation being carried out at a rate of 1.5% to 3% per minute based upon the total ammonia introduced into the acidulated mixture until 50% to 60% of the total ammonia is added, then at below 0.8% per minute based upon said total ammonia until 70% to 80% of said total ammonia is added, and completing the addition of the ammonia at a rate not exceeding about 3% per minute based upon said total ammonia; and step 3, drying the resultant miture to produce a fertilxizer containing not more than about 2% by weight of water.

2. The proces of producing high-nitrogen, low-chloride nitraphosphate complete fertilizers which comprises: step 1, treating phosphate rock with an acid from the group consisting of nitric acid and mixtures of nitric and phosphoric acids containing at least 50% nitric acid in the proportions of from about 8 to about 20 equivalents of acid per mol of $P_2O_5$ in the phosphate rock; step 2, incorporating potassium sulfate in the acidulated mixture in amount to produce a final product containing from about 8% to about 14% $K_2O$ and ammoniating the acidulated material employing from about 0.6 to about 0.8 mol of ammonia per equivalent of acid and enough water so that the ammoniated material leaving the ammoniation treatment contains from 20% to 30% by weight of water while agitating the reaction mixture, the ammoniation being carried out at a rate of from 1.5% to 3% per minute based on the total ammonia introduced into the acidulated mixture until 50% to 55% of the total ammonia is added, then at a rate of from 0.6% to 0.7% by weight per minute based on said total ammonia until about 75% of said total ammonia is added, and completing the addition of the ammonia at a a rate of from 1% to 2% per minute based on the weight of said total ammonia; and step 3, drying the resultant mixture to produce a fertilizer containing not more than 2% by weight of water.

3. The process of producing high-nitrogen, low-chloride nitraphosphate complete fertilizers which comprises: step 1, treating phosphate rock with nitric acid in the proportions of from about 11 to about 16 equivalents of nitric acid per mol of $P_2O_5$ in the phosphate rock; step 2, incorporating potassium sulfate in the acidulated mixture in amount to produce a final product containing from about 8% to about 14% $K_2O$ and ammoniating the acidulated material employing from about 0.6 to about 0.8 mol of ammonia per equivalent of acid and enough water so that the ammoniated material leaving the ammoniation treatment contains 20% to 30% by weight of water while agitating the reaction mixture, the ammoniation being carried out at a rate of about 3% per minute based on the total ammonia introduced into the acidulated mixture until about 55% of the total ammonia is added, then at a rate of from 0.6% to 0.7% by weight per minute based on said total ammonia until about 75% of said total ammonia is added, and completing the addition of the ammonia at a rate of from 1% to 2% per minute based on the weight of said total ammonia; and step 3, drying the resultant mixture to produce a fertilizer containing not more than 2% by weight of water.

4. The process of producing high-nitrogen, low-chloride nitraphosphate complete fertilizers which comprises: step 1, treating phosphate rock with an acid from the group consisting of nitric acid and mixtures of nitric and phosphoric acid containing at least 50% nitric acid in the proportions of from about 8 to about 20 equivalents of acid per mol of $P_2O_5$ in the phosphate rock; step 2, incorporating potassium sulfate in the acidulated mixture in amount to produce a final product containing from about 8% to about 14% $K_2O$ and ammoniating the acidulated material employing from about 0.6 to about 0.8 mol of ammonia per equivalent of acid and enough water so that the ammoniated material leaving the ammoniation treatment contains about 20% to about 30% by weight of water while agitating the reaction mixture, the ammoniation after addition of from 50% to 60% of the total ammonia being carried out at a rate not exceeding 0.8% per minute based on the total ammonia employed during the ammoniation until from 70% to 80% of said total ammonia has been added and thereafter completing the addition of the ammonia at a higher rate of addition of the ammonia; and step 3, drying the resultant mixture.

5. The process of producing high-nitrogen, low-chloride nitraphosphate complete fertilizers which comprises: step 1, treating phosphate rock with an acid from the group consisting of nitric acid and mixtures of nitric and phosphoric acid containing at least 50% nitric acid in the proportions of from about 8 to about 20 equivalents of acid per mol of $P_2O_5$ in the phosphate rock; step 2, ammoniating the acidulated mixture, employing from about 0.6 to about 0.8 mol of ammonia per equivalent of acid and enough water so that the ammoniated material contains about 20% to about 30% by weight of water, the ammoniation being carried out at a rate of 1.5% to 3% per minute based upon the total ammonia introduced into the acidulated mixture until 50% to 60% of the total ammonia is added, then at below 0.8% per minute based upon said total ammonia until 70% to 80% of said total ammonia is added, and completing the addition of the ammonia at a rate of from 1% to 2% per minute based on the weight of said total ammonia; step 3, incorporating potassium sulphate in said acidulated mixture at a point prior to the stage of the ammoniation at which the pH of the ammoniated material reaches 1 in amount to produce a final product containing from about 8% to about 14% $K_2O$; and step 4, drying the ammoniated material.

References Cited in the file of this patent

UNITED STATES PATENTS

| | | |
|---|---|---|
| 2,726,949 | Andres et al. | Dec. 13, 1955 |
| 2,874,036 | Datin | Feb. 17, 1959 |
| 2,879,153 | Nielsson | Mar. 24, 1959 |
| 2,913,329 | Geirsberger | Nov. 17, 1959 |